No. 685,263. Patented Oct. 29, 1901.
P. L. A. DÉCOR.
WEIGHT OR LEAD FOR USE IN ANGLING.
(Application filed Aug. 9, 1901.)
(No Model.)
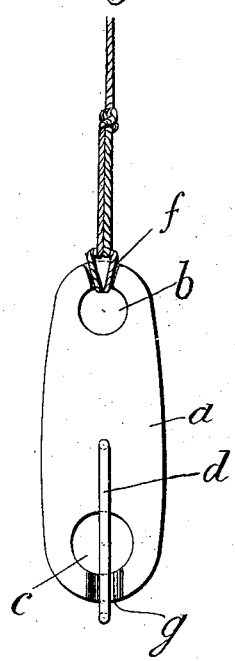
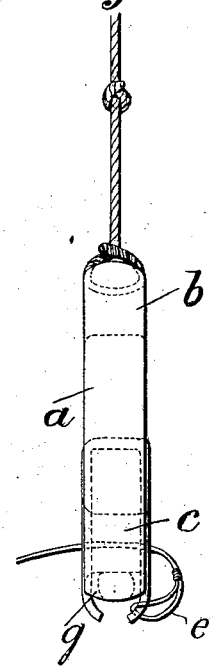
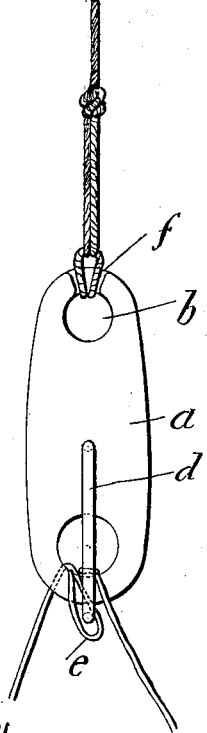
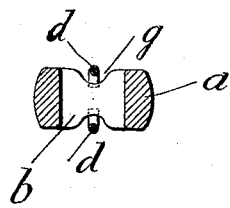
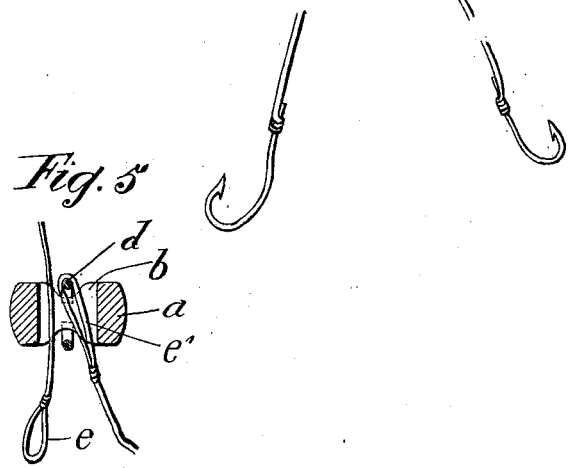

UNITED STATES PATENT OFFICE.

PAUL LOUIS ANSELME DÉCOR, OF ORAN, ALGERIA.

WEIGHT OR LEAD FOR USE IN ANGLING.

SPECIFICATION forming part of Letters Patent No. 685,263, dated October 29, 1901.

Application filed August 9, 1901. Serial No. 71,425. (No model.)

*To all whom it may concern:*

Be it known that I, PAUL LOUIS ANSELME DÉCOR, manufacturer, a citizen of the Republic of France, residing at Oran, Algeria, 9 Rue Shneiler, have invented certain new and useful Improvements in and Relating to Weights or Leads for Use in Angling, of which the following is a specification.

The present invention consists of improvements in and relating to weights or "leads" for use in angling, allowing of very quickly and easily mounting and dismounting the lines to which the hooks are fixed.

In the annexed drawings, Figure 1 represents an elevation of the improved weight, the hook line or lines being removed. Fig. 2 is a horizontal section on the line A B, Fig. 1. Figs. 3, 4, and 5 are respectively an end view, an elevation, and a section of the same device as represented in Figs. 1 and 2, but with the hook-lines attached.

In the various figures the same parts are marked with similar reference-letters.

In the same manner as similar fishing-tackle for keeping the hooks at a certain distance from the bottom of the water the apparatus which is the object of the present invention comprises a heavy mass or weight $a$, preferably of lead and provided with, for instance, two holes $b$ and $c$ of different diameters and having their edges suitably rounded off.

A metal rod $d$ of small diameter passes through the weight $a$ from one side to the other and is then bent toward the hole $c$ in order to form two parallel branches dividing said hole into two equal parts, the said branches being sunk into the weight for a certain length in a longitudinal direction and the ends thereof slightly bent around under the weight, as shown in Fig. 3. On each surface, between the openings of the holes $b$ and $c$ and the extremities of the weight, small recesses $f$ and $g$ are made. The end of the line to which the lead is fixed is placed in the recesses $f$, while the recesses $g$ furnish around the bent ends of the rod $d$ a space sufficient for the passage of the loops $e$ of the hook-lines to be attached, as shown in Figs. 2 and 5.

The manner of using the apparatus is as follows: To attach a hook-line to the weight, the loop $e$ of the said line is first passed through the hole $c$, as shown in Fig. 5, and then over the end of the rod $d$ corresponding to the outlet of the hole, Figs. 3 and 4. By passing it into the recess $g$ it is then sufficient to pull the line in order to bring it into the position shown in Fig. 5, where the eye $e'$ is shown in position.

It is evident that by reversing the operation the line or lines can be very rapidly removed.

It will be noticed that it is impossible with the improved arrangement for the lines to accidentally get loose. The pull exercised by the fish tends to keep them firmly in position, and since they bear on the edge of the hole $c$ for a considerable length they act only to a very small extent on the rod $d$.

The materials of which the weight can be manufactured being only slightly oxidizable and inexpensive and practically the same as those used in ordinary fishing-tackle, it results that to the qualities of easy and rapid attachment of the hook-line is added that of being of a moderate price.

Having now particularly described and ascertained the nature of my said invention and in what manner the same is to be performed, I declare that what I claim is—

An improved weight or "lead" for use in angling, provided with two holes, one for fixing the weight to the end of a line, the other for the passage of the loops of the hook-lines, said loops being passed over one of the parallel branches of a metal rod partly sunk into the weight and bent down under the latter toward its ends, a sufficient space being provided between the latter and the lower part of the weight by suitably-hollowed recesses for the purpose of allowing the loops to be passed through, substantially as described and illustrated in the annexed drawings.

Signed at Oran, Algeria, this 2d day of July, 1901.

PAUL LOUIS ANSELME DÉCOR.

Witnesses:
LÉON BORAMÉ,
PAUL BACAND.